G. CONN, Jr.
HORSE TWITCH.
APPLICATION FILED FEB. 3, 1916.
1,201,560.
Patented Oct. 17, 1916.
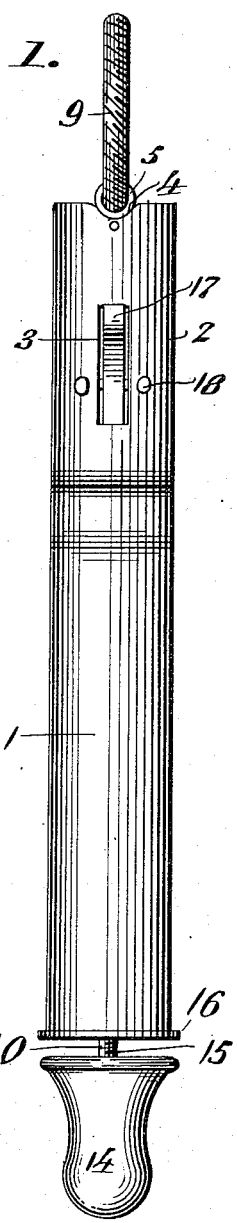
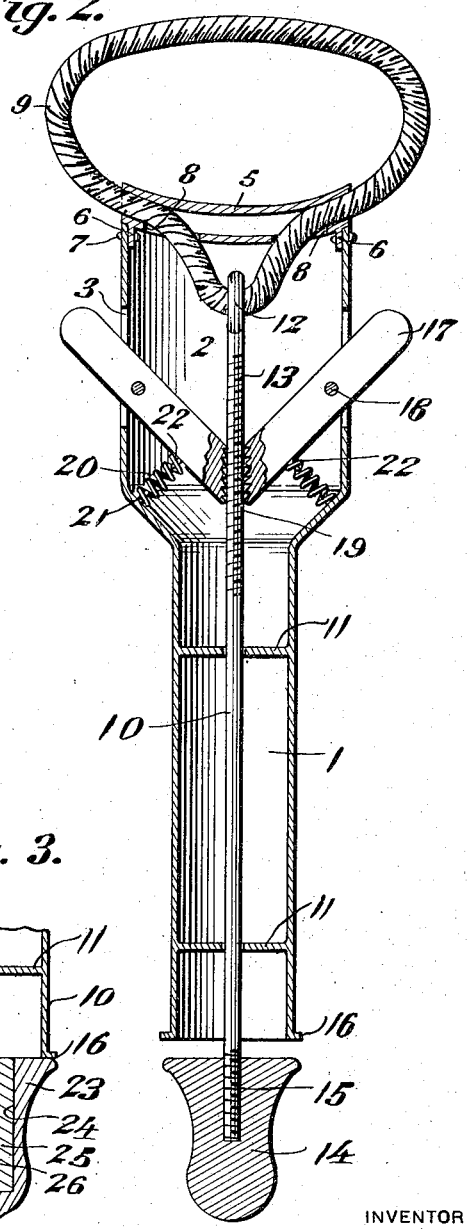
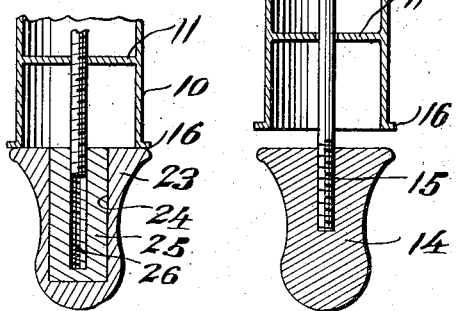
WITNESSES
INVENTOR
George Conn, Jr.
BY
ATTORNEY

UNITED STATES PATENT OFFICE.

GEORGE CONN, JR., OF ROYAL CENTER, INDIANA.

HORSE-TWITCH.

1,201,560.  Specification of Letters Patent.  Patented Oct. 17, 1916.

Application filed February 3, 1916. Serial No. 75,997.

*To all whom it may concern:*

Be it known that I, GEORGE CONN, Jr., a citizen of the United States, residing at Royal Center, in the county of Cass and State of Indiana, have invented certain new and useful Improvements in Horse-Twitches, of which the following is a specification.

My invention relates to animal restraining devices and more particularly to a horse twitch.

The primary object of my invention resides in the provision of a casing having a novel flexible nose engaging loop associated therewith, novel means being also associated with the casing and the nose engaging loop for tightening the nose engaging loop on an animal, the loop being retained in an adjusted position thereby permitting the operator's hands to be free.

Another object of my invention resides in the provision of novel means in the casing for removably holding the nose engaging loop in position, the holding means being resiliently mounted to permit of quick release of the nose engaging loop when desired.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—Figure 1 is a side elevational view of my invention; Fig. 2 is a vertical sectional view of the case illustrating to advantage the construction and arrangement of the parts; and Fig. 3 is a fragmentary vertical sectional view with a modified form of operating knob or handle.

Referring more particularly to the drawings in which similar reference numerals designate like or corresponding parts throughout the several views, I provide a hollow metallic case, the lower part of which is cylindrical in cross section while the upper part 2 is enlarged into an oval shaped configuration in cross section, the ends thereof being provided with oppositely disposed vertical slots 3 for a purpose to be described. The upper edges of the ends of the oval shaped portion or case are provided with oppositely disposed recesses 4 in which is supported an arcuate tubular nose loop holder 5. The holder is rigidly connected to the casing beneath the recesses through the medium of depending flanges 6 and rivets 7 and is further provided on its lower surface with a pair of uniformly spaced circular openings 8. Associated with the open ends of the tubular holder and the openings 8 therein is a flexible nose engaging loop 9 in the present instance formed preferably of a piece of rope.

In order to adjust the size of the loop or to tighten it about the nose of an animal I have provided my improved adjusting means to accomplish the adjusting of the loop. A rod 10 is slidably mounted in the spaced guides 11 in the cylindrical portion 1 of the casing. The inner end of the rod terminates in a loop 12 which is engaged about the nose loop while a portion of the rod adjacent the loop is threaded as indicated by the numeral 13. A handle 14 is in screw threaded engagement as at 15 with the outer or projecting end of the rod, said handle abutting an annular flange 16 at times to limit the inward movement of the rod. It will now be apparent that by pulling the rod from the cylindrical end of the casing through the medium of a handle the nose loop will be drawn through the tubular holder into the enlarged end of the casing and tightened about the nose of an animal. For the purpose of removably holding the rod in various adjusted positions I have pivotally mounted locking pawls 17 in the upper end 2 of the casing through the medium of rivets 18, said pawls operating in and extending beyond the vertical slots 2 to permit of engagement of the fingers of the operator therewith. The inner ends of the pawls are cut diagonally and threaded as indicated by the numeral 19 and are arranged in engagement with the threaded portion 13 of the rod. These pawls which slant downwardly in the casing are maintained in engagement through the medium of resilient means consisting of coil springs 20 the respective ends of which are disposed about lugs 21 in the casing and lugs 22 on the lower surface of the pawl. It will now be readily apparent that when the rod is pulled out from the casing to its desired position the pawls 17 will be resiliently held in engagement with the threaded portion of the rod and will consequently hold the rod in its adjusted position.

In Fig. 3 of the accompanying drawings I have shown a modified form of the handle of my invention. In this instance a handle 22 has a chamber 24 therein in which is rigidly connected a metallic core 25, the core in turn being provided with an inwardly extending screw threaded recess 26 for engagement with the threaded end of the rod. Adjustment of the loop is facilitated by turning the handle which causes the rod to work into the screw threaded recess 26, the handle being normally arranged in engagement with the annular flange 16 of the lower portion of one end of the casing.

Although I have shown and described the preferred embodiment of my invention I desire it to be understood that I am not to be limited to the exact details shown, however, I desire that great stress be laid upon the arrangement of the novel means for holding the nose loop in engagement with the nose of an animal and which will permit the operator's hands to be free, requiring no holding. Attention is also directed to the novel means for removably and adjustably holding the rod.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent; is—

1. A horse twitch including a casing, a flexible nose engaging loop, an arcuate tubular holder rigidly connected to the casing and receiving the loop, a rod slidably mounted in the casing and having one end engaged on the loop, pivotally mounted locking pawls arranged in removable engagement with the rod, a handle mounted on the outer end of the rod for facilitating the adjustment of the loop.

2. A horse twitch including a casing, a flexible nose loop associated with the casing, a threaded rod slidably mounted in the casing and in engagement with the loop, a handle on the outer projecting end of the rod for drawing the loop into the casing, pivotally mounted pawls having their inner ends threaded, the coil springs for holding the inner ends of the pawls in engagement with the threaded portion of the rod to consequently hold the loop in an adjusted position.

In testimony whereof I affix my signature in presence of two witnesses.

GEORGE CONN, Jr.

Witnesses:
FRANZ E. ROGERS,
OLIVER P. BENNY.

Copies of this patent may be obtained for five cents each, by addressing the "Commissioner of Patents, Washington, D. C."